United States Patent
Shacham et al.

(10) Patent No.: US 10,565,184 B2
(45) Date of Patent: Feb. 18, 2020

(54) METHOD AND SYSTEM FOR COMMITTING TRANSACTIONS IN A SEMI-DISTRIBUTED MANNER

(71) Applicant: Yahoo Holdings, Inc., Sunnyvale, CA (US)

(72) Inventors: Ohad Shacham, Kfar Monash (IL); Edward Bortnikov, Haifa (IL); Idit Keidar, Haifa (IL); Yonatan Gottesman, Haifa (IL)

(73) Assignee: Oath Inc., New York, NY (US)

( * ) Notice: Subject to any disclaimer, the term of this patent is extended or adjusted under 35 U.S.C. 154(b) by 486 days.

(21) Appl. No.: 15/338,761

(22) Filed: Oct. 31, 2016

(65) Prior Publication Data
US 2018/0121487 A1 May 3, 2018

(51) Int. Cl.
*G06F 16/23* (2019.01)

(52) U.S. Cl.
CPC ...... *G06F 16/2365* (2019.01); *G06F 16/2322* (2019.01); *G06F 16/2329* (2019.01); *G06F 16/2379* (2019.01)

(58) Field of Classification Search
CPC ......... G06F 17/30371; G06F 17/30377; G06F 16/2308; G06F 16/2379; G06F 16/2322; G06F 16/2329; G06F 16/2365
USPC ...................................................... 707/692
See application file for complete search history.

(56) References Cited

U.S. PATENT DOCUMENTS

| | | | | |
|---|---|---|---|---|
| 6,178,425 B1* | 1/2001 | Brodersen | ............... | G06F 16/27 707/802 |
| 6,397,227 B1* | 5/2002 | Klein | ................... | G06F 16/2379 707/640 |
| 8,838,534 B2* | 9/2014 | Fowler | .................... | G06F 9/466 707/615 |
| 2006/0101081 A1* | 5/2006 | Lin | ..................... | G06F 16/2343 707/769 |
| 2006/0219772 A1* | 10/2006 | Bernstein | ............ | G06F 16/2308 235/379 |
| 2011/0029490 A1* | 2/2011 | Agarwal | ................. | G06F 9/467 707/684 |
| 2012/0166407 A1* | 6/2012 | Lee | ..................... | G06F 16/2365 707/703 |

(Continued)

OTHER PUBLICATIONS

Ferro, Daniel Gomez et al. "Omid: Lock-free Transactional Support for Distributed Data Stores", Yahoo! Research, ICDE Conference 2014, 2014 IEEE, pp. 676-687, (Year: 2014).*

*Primary Examiner* — Shahid A Alam
(74) *Attorney, Agent, or Firm* — Pillsbury Winthrop Shaw Pittman LLP

(57) ABSTRACT

The present teaching relates to committing transactions over a database in a semi-distributed manner. In one example, a transaction is executed to access a plurality of keys stored in the database. A request is transmitted to a transaction management engine to commit the transaction. The transaction management engine performs a conflict check between the transaction and one or more transactions running concurrently with the transaction, and generates an instruction based on the conflict check. The instruction is received from the transaction management engine. Based on the instruction, one or more of the plurality of keys are updated in the database or data added by the transaction to the database are erased.

15 Claims, 15 Drawing Sheets

(56) References Cited

U.S. PATENT DOCUMENTS

| | | | |
|---|---|---|---|
| 2014/0330767 A1* | 11/2014 | Fowler | G06F 9/466 707/607 |
| 2015/0074070 A1* | 3/2015 | Bortnikov | G06F 16/2308 707/703 |
| 2017/0220617 A1* | 8/2017 | Bortnikov | G06F 16/2329 707/703 |

* cited by examiner

METHOD AND SYSTEM FOR COMMITTING TRANSACTIONS IN A SEMI-DISTRIBUTED MANNER

BACKGROUND

1. Technical Field

The present teaching relates to methods, systems, and programming for database operation. Particularly, the present teaching is directed to methods and systems of committing a transaction over a database in a semi-distributed manner.

2. Discussion of Technical Background

A database may store a huge amount of data as pairs of a key and a value. A key-value database may support transactions that include one or more data-manipulation statements and queries, each reading and/or writing information in the database. For example, a database system may include a database supporting atomic put and get access to keys stored in the database, and a transaction management component supporting transactions including multiple put and get operations. A simple transaction may include steps of: begin the transaction, execute a set of put and/or get operations in the transaction; and commit the transaction if no errors occurred during the execution.

A transaction commit operation applies all data manipulations within the scope of the transaction and persists the results to the database. In existing methods, a common approach, either distributed or centralized, is used throughout the commit processing. On one hand, distributed designs like Google Percolator use a two-phase commit protocol for conflict detection as well as for persisting the commit point. On the other hand, Yahoo's Omid uses a centralized entity for both. The disadvantage of both existing approaches is an excessive latency that they impose on some part of the commit processing. Percolator requires multiple rounds of communication, while Omid resorts to batching commits at the transaction management component to sustain the rate.

Therefore, there is a need to provide an improved solution for transaction commit operations to solve the above-mentioned problems.

SUMMARY

The present teaching relates to methods, systems, and programming for database operation. Particularly, the present teaching is directed to methods and systems of committing a transaction over a database in a semi-distributed manner.

In an example, a method, implemented on a machine having at least one processor, storage, and a communication platform connected to a network for database operation is disclosed. A transaction is executed to access a plurality of keys stored in a database. A request is transmitted to a transaction management engine to commit the transaction. The transaction management engine performs a conflict check between the transaction and one or more transactions running concurrently with the transaction, and generates an instruction based on the conflict check. The instruction is received from the transaction management engine. Based on the instruction, one or more of the plurality of keys are updated in the database or data added by the transaction to the database are erased.

In another example, a method, implemented on a machine having at least one processor, storage, and a communication platform connected to a network for database operation is disclosed. A request is received from a client device to commit a transaction that accessed a plurality of keys stored in a database. A conflict check is performed between the transaction and one or more transactions running concurrently with the transaction. An instruction is provided to the client device based on the conflict check. The client device updates one or more of the plurality of keys in the database or erases data added by the transaction to the database, based on the instruction.

In a different example, a system, having at least one processor, storage, and a communication platform connected to a network for database operation is disclosed. The system comprises a transaction executer and an operation committer. The transaction executer is configured for executing a transaction to access a plurality of keys stored in a database. The operation committer is configured for: transmitting, to a transaction management engine, a request to commit the transaction, wherein the transaction management engine performs a conflict check between the transaction and one or more transactions running concurrently with the transaction, and generates an instruction based on the conflict check, receiving the instruction from the transaction management engine, and based on the instruction, updating one or more of the plurality of keys in the database or erasing data added by the transaction to the database.

Other concepts relate to software for implementing the present teaching on database operation. A software product, in accord with this concept, includes at least one machine-readable non-transitory medium and information carried by the medium. The information carried by the medium may be executable program code data, parameters in association with the executable program code, and/or information related to a user, a request, content, or information related to a database, etc.

In one example, a machine-readable tangible and non-transitory medium having information for database operation is disclosed. The information, when read by the machine, causes the machine to perform the following. A transaction is executed to access a plurality of keys stored in a database. A request is transmitted to a transaction management engine to commit the transaction. The transaction management engine performs a conflict check between the transaction and one or more transactions running concurrently with the transaction, and generates an instruction based on the conflict check. The instruction is received from the transaction management engine. Based on the instruction, one or more of the plurality of keys are updated in the database or data added by the transaction to the database are erased.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
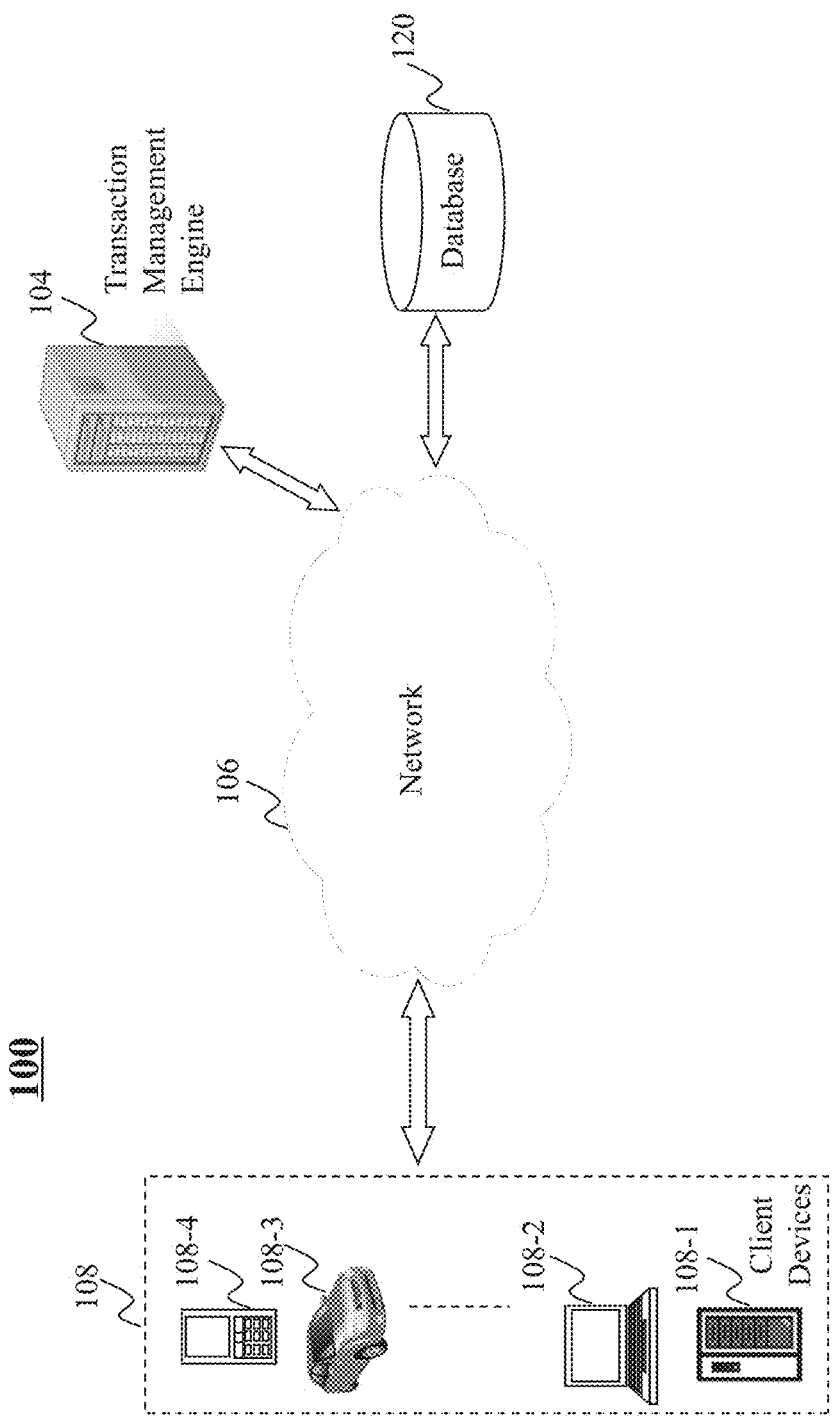
FIG. 1 is a high level depiction of an exemplary system for performing database operations, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present teaching relates to methods, systems, and programming for database operations. Particularly, the present teaching is directed to methods and systems of committing a transaction over a database in a semi-distributed manner.

A key-value database may support transactions that include one or more data-manipulation statements and queries, each reading and/or writing information in the database. For example, the system architecture may be based on an underlying data store, e.g. HBase, supporting atomic put and get access to keys, and a transaction management (TM) component supporting transactions including multiple put and get operations. These two components may be used by ephemeral fault-prone clients to support transactions. A simple transaction may include steps of: begin the transaction, execute a set of put and/or get operations in the transaction; and commit the transaction if no errors occurred during the execution. A transaction commit operation applies all data manipulations within the scope of the transaction and persists the results to the database. Unlike existing methods, the present teaching discloses a novel semi-distributed approach for transaction commit operation.

The system disclosed in the present teaching employs a centralized TM for allocating globally unique monotonically increasing timestamps to transactions as well as for detecting conflicts among concurrent transactions; while distributing the final commit processing phase, which defines transaction commit points and persists them, among the client devices for improving the system scalability. By doing so, the present teaching can enjoy both (1) retain the critical conflict resolution function centralized while eliminating the need for a two-phase commit, and (2) avoid centralized persistent logging which is the biggest bottleneck at the centralized TM.

The present teaching reduces the latency of commit operations in transaction processing platforms, without compromising the throughput. It may do so by embedding the persistent transaction state within the data records. The responsibility for recording this state can be shifted from the central TM to the client, hence eliminating the bottleneck. In addition, the present teaching includes a novel method to overcome client failures that may affect the correctness of commit processing. According to various embodiments, the present teaching makes transaction processing over key-value stores suitable for real-time applications, by reducing commit time that is a key contributor to latency.

An essence of the present teaching is that conflict detection and timestamp/ID allocation is managed by a centralized TM, while the actual commit (and persistence of the commit decision) is performed in a distributed manner, by the clients. While conflict detection can be done entirely in memory and scale well on multi-core machines, writing the commit indication must be persistent to ensure that even in case of crash, later transactions will not miss committed values, which therefore creates an I/O bottleneck. Based on the new approach proposed in the present teaching, the bottleneck is eliminated, while conflict detection can still benefit from centralization, e.g. increased simplicity, avoiding costly distributed commit protocols, etc.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary system 100 for performing database operations, according to an embodiment of the present teaching. In FIG. 1, the exemplary system 100 includes one or more client devices 108, a network 106, a transaction management engine 104, and a database 120.

Figure 2:
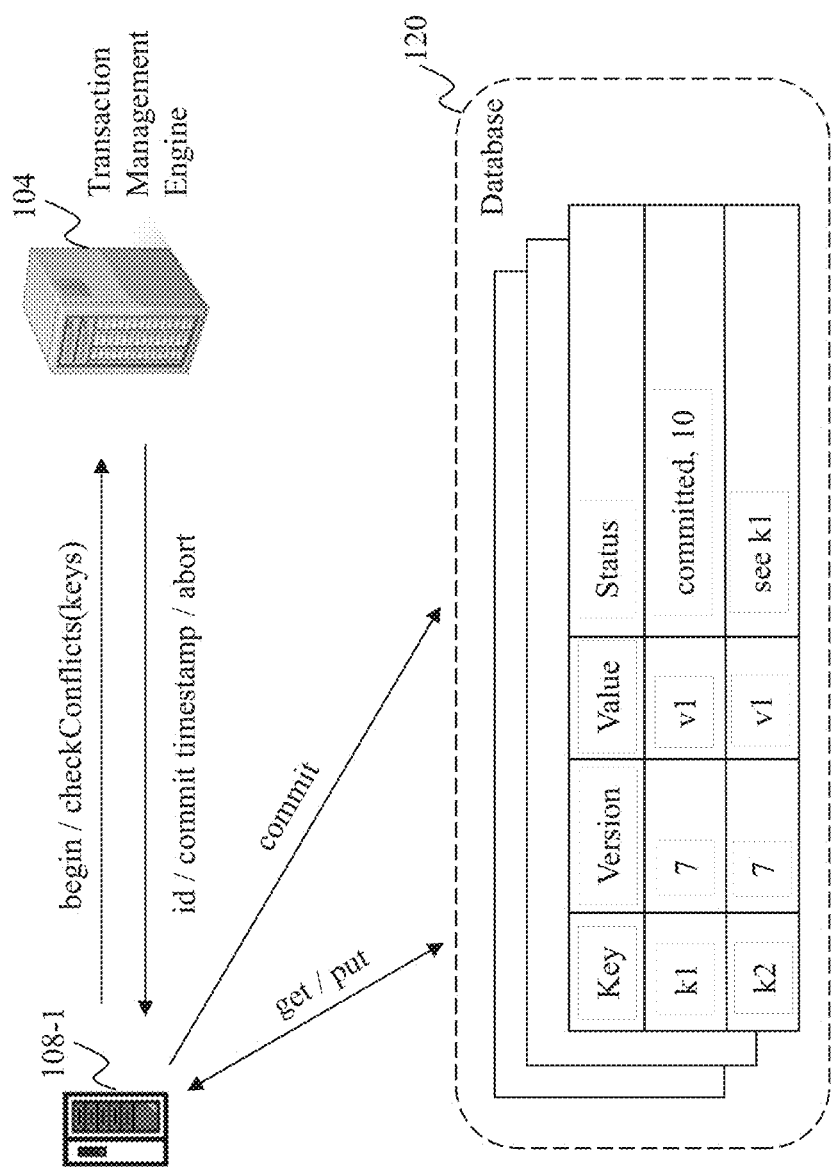
FIG. 2 illustrates an exemplary architecture for semi-distributed commit operations over a database, according to an embodiment of the present teaching.

The database 120 may include a plurality of data (e.g., (key, value) pairs) each corresponding to a version number. The plurality of (key, value) pairs may be organized using a data structure as shown in FIG. 2. Data may be stored in data tables in the database 120. Data is multi-versioned, that is, each value of a key is associated with a different version. The "value" can be a single column or may include multiple columns, as defined by the application's schema. In addition, each data table has a metadata column indicating the status of the transaction that created it (whether it is committed, and if yes, with what timestamp) or referring to another table entry holding this information. In one example, the first key written by the transaction holds the status, while each of the other keys initially points to this key, and may be lazily updated to reflect its commit status after the transaction is complete.

The one or more client devices 108 may be one or more computing devices connected to the network 106, which may include, but not limited to, a desktop computer 108-1, a laptop computer 108-2, a built-in device in a motor vehicle 108-3, or a mobile phone 108-4. The one or more client devices 108 may transmit a begin request for beginning a transaction with respect to the database 120 to the transaction management engine 104 via the network 106, and receives a transaction ID associated with the transaction from the transaction management engine 104 for executing the transaction. Based on the transaction ID, the client device may execute the transaction by accessing a plurality of keys stored in the database 120. The plurality of keys may include keys read and/or written by the transaction. For example, a transaction may include a sequence of put and/or get operations. A get operation is to retrieve a value associated with a key specified in the get operation. A put operation is to write a key in the database with a value specified in the put operation. After executing the transaction, the client device may transmit a request to commit the transaction to the transaction management engine 104. In one embodiment, the request is also a check conflict request for the transaction management engine 104 to perform conflict check between the transaction and other transactions concurrently running with the transaction. Then the client device may receive an instruction from the transaction management engine 104 to either persistently commit the transaction by updating one or more keys in the database 120 or abort the transaction by erasing data added by the transaction to the database 120.

The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof.

The transaction management engine 104 may receive from a client device a request for beginning a transaction, obtain a timestamp based on a version clock, generate a transaction ID, and provide the transaction ID to the client device for executing the transaction. The transaction management engine 104 may also receive a request from the client device to commit the transaction that accessed a plurality of keys stored in the database 120, perform a conflict check between the transaction and one or more transactions running concurrently with the transaction, and provide an instruction to the client device based on the conflict check for the client device to either commit or abort the transaction.

FIG. 2 illustrates an exemplary architecture for semi-distributed commit operations over a database, according to an embodiment of the present teaching. As shown in FIG. 2, the client device 108-1 in this example is configured for performing get/put operations in a transaction and persisting the transaction commit decision, while the transaction management engine 104 in this example is configured for check conflicts between transactions, allocating transaction IDs and commit IDs, and providing commit or abort instructions to client devices.

FIG. 2 shows an example of a data table immediately after the commit of a transaction that wrote first to k1 and then to k2. This transaction was initiated with ID 7 and has committed with commit timestamp 10. In this example, both the transaction ID and the commit timestamps/IDs are allocated by the transaction management engine 104. Eventually, the status column of k2 may also be changed to "committed, 10".

Figure 3:
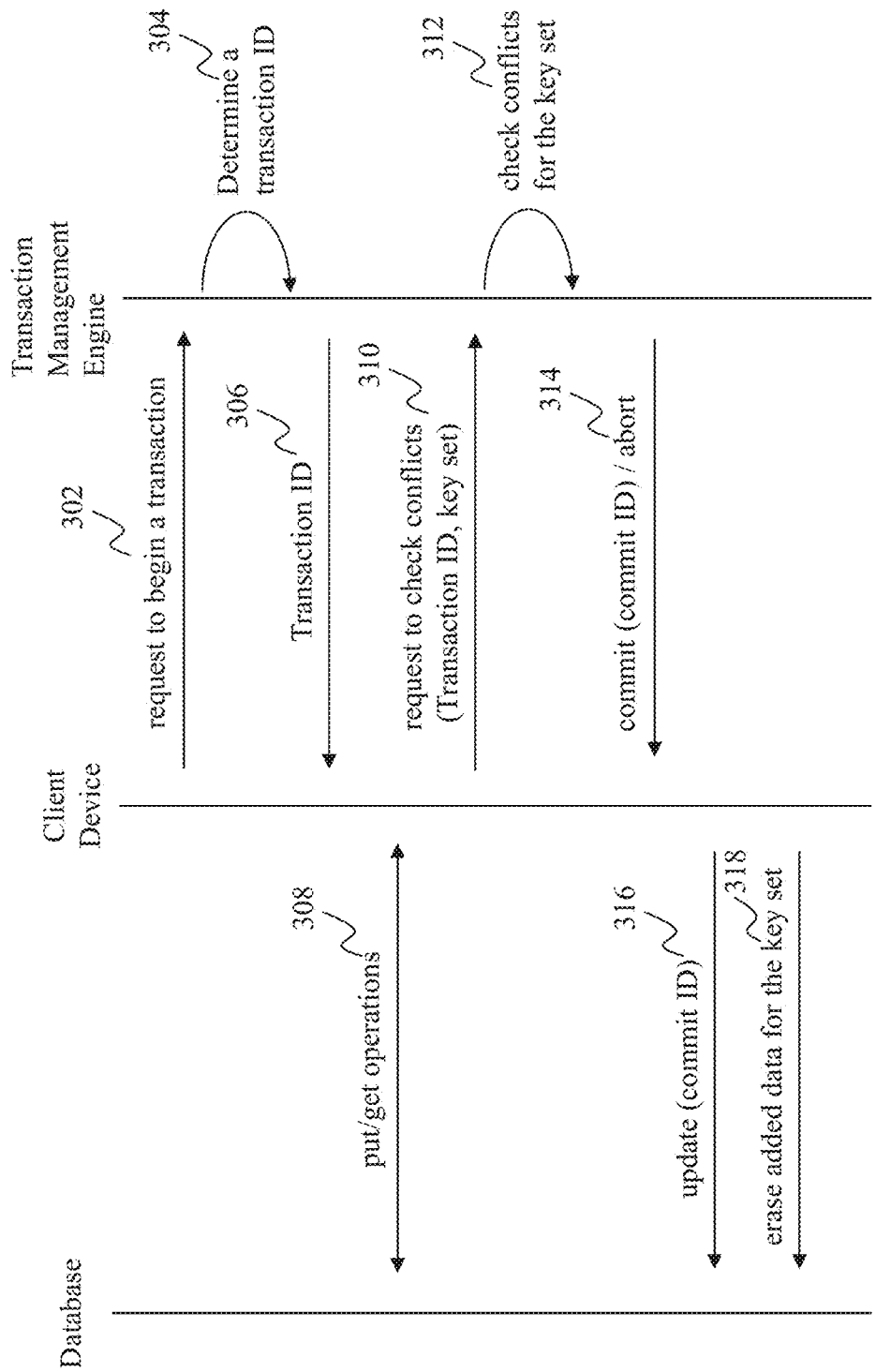
FIG. 3 illustrates an exemplary flow for the semi-distributed commit operations in transaction management over a database, according to an embodiment of the present teaching.

FIG. 3 illustrates an exemplary flow for the semi-distributed commit operations in transaction management over a database, according to an embodiment of the present teaching. As shown in FIG. 3, the exemplary process starts from a client device sending a request to begin a transaction at 302. Then at 304, the transaction management engine may allocate a transaction ID to be associated with the transaction. The transaction management engine may send the transaction ID at 306 to the client device. The client device executes at 308 the transaction based on the transaction ID by performing a sequence of put/get operations in the transaction, with respect to data in the database. At 310, the client device may send a request to check conflicts for a set of keys associated with the transaction ID to the transaction management engine. In one example, to enforce snapshot isolation semantics, the set of keys is the transaction's write-set, which is used to detect write-write conflicts. In another example, to serialize transactions, both the read-sets and write-sets are provided in the set of keys in order to detect write-write conflicts as well as read-write conflicts.

The transaction management engine may check conflicts for the key set at 312; and send an instruction at 314 to the client device to either commit the transaction or abort the transaction due to a conflict. The commit instruction may include a commit ID. Upon receiving a commit instruction, the client device may update persistently the data in the database according to the commit ID. Upon receiving an abort instruction, the client device may abort the transaction by erasing all data related to the key set added to the database by the transaction.

In this manner, the system disclosed in the present teaching can retain the critical conflict resolution function centralized at the transaction management engine, and distribute the final commit processing phase, which defines transaction commit points and persists them, among the client devices for improving the system scalability.

Figure 4:
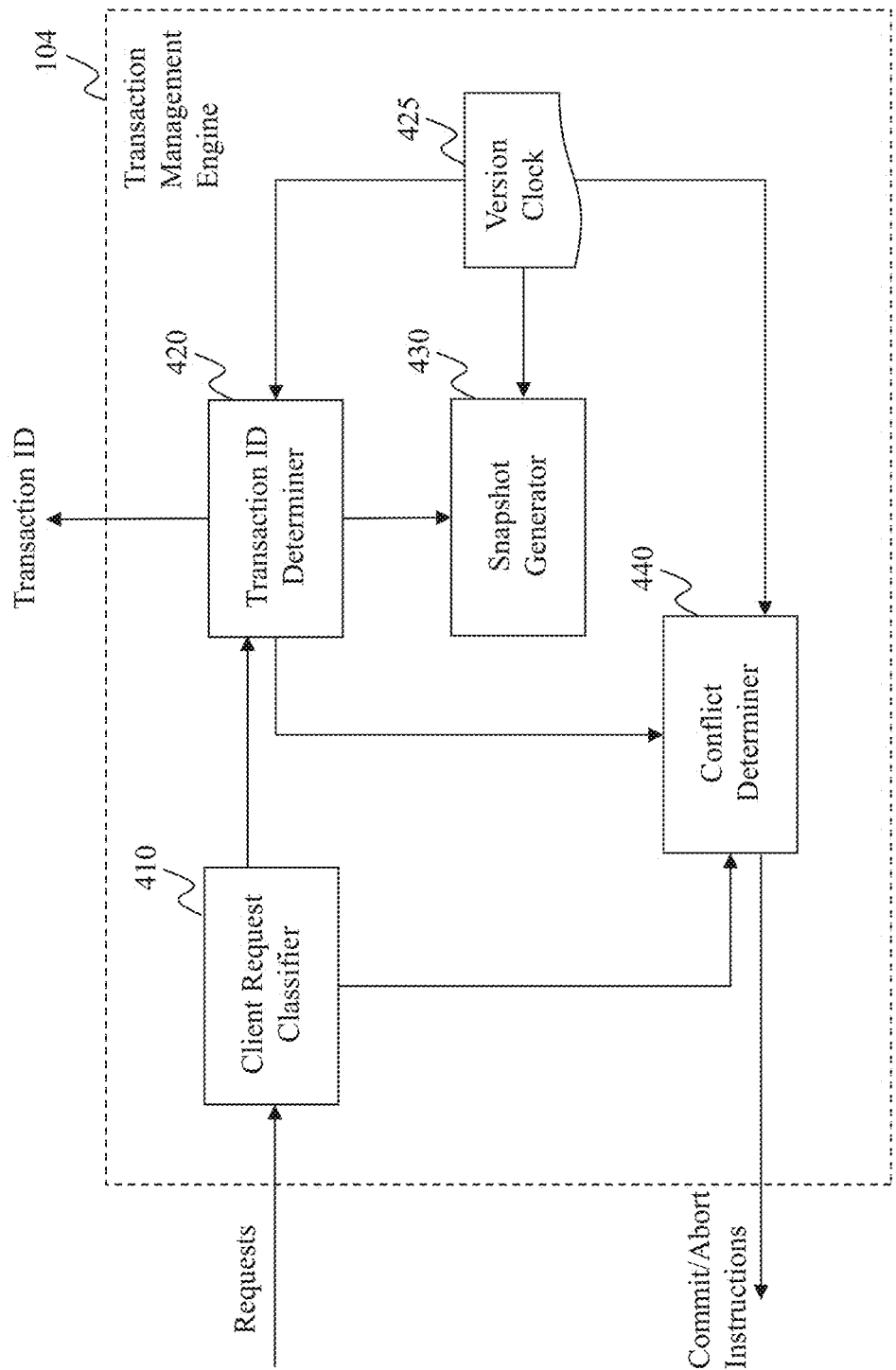
FIG. 4 is an exemplary diagram of a transaction management engine, according to an embodiment of the present teaching.

FIG. 4 is an exemplary diagram of a transaction management engine 104, according to an embodiment of the present teaching. As shown in FIG. 4, the transaction management engine 104 in this example includes a client request classifier 410, a transaction ID determiner 420, a snapshot generator 430, a version clock 425, and a conflict determiner 440.

The client request classifier 410 in this example may receive requests from client devices. For each request, the client request classifier 410 can classify the request to determine a function related to a transaction to be executed by a client device. The function may be to begin a transaction at the client device or to check conflicts for a transaction executed at the client device. Based on the classification, the client request classifier 410 can forward the request to the transaction ID determiner 420 when the request is for beginning a transaction at the client device, and can forward the request to the conflict determiner 440 when the request is for checking conflicts with respect to a transaction executed at the client device.

The transaction ID determiner 420 in this example may receive a begin request from the client request classifier 410 and obtain a timestamp from the version clock 425. The transaction ID determiner 420 can perform a begin operation based on the begin request and return a transaction ID associated with the transaction to the client device. The transaction ID may be a globally unique and monotonically increasing ID determined based on the timestamp obtained from the version clock 425. In one embodiment, when the system implements snapshot isolation, the ID can be used to obtain the read snapshot of a transaction. In one example, the transaction ID determiner 420 may send the transaction ID to the conflict determiner 440 for checking conflicts. In another example, the transaction ID determiner 420 may send information about running transactions to the snapshot generator 430 for generating a snapshot.

The snapshot generator 430 in this example may generate a snapshot based on status of all active transactions, e.g. based on information obtained from the transaction ID determiner 420.

The conflict determiner 440 in this example may receive a check conflict request from the client request classifier 410 with respect to a transaction. The conflict determiner 440 can perform a conflict check between the transaction and other transactions running concurrently with the transaction. The conflict check may be based on a transaction ID associated with the transaction.

Upon determining that there is no conflict with respect to the transaction, the conflict determiner 440 may generate a commit instruction and provide it to the client device for final committing. For example, the conflict determiner 440 may generate a commit ID based on the version clock 425 and send the commit ID with the commit instruction to give an authorization to the client device to persistently update the data written by the transaction.

Upon determining that there is a conflict between the transaction and any of the concurrently running transactions, the conflict determiner 440 may generate an abort instruction and provide it to the client device for aborting the transaction. For example, this may happen when a first transaction with a lower transaction ID attempts to commit with a common key in a set of keys written and committed by a second transaction with a higher transaction ID.

Figure 5:
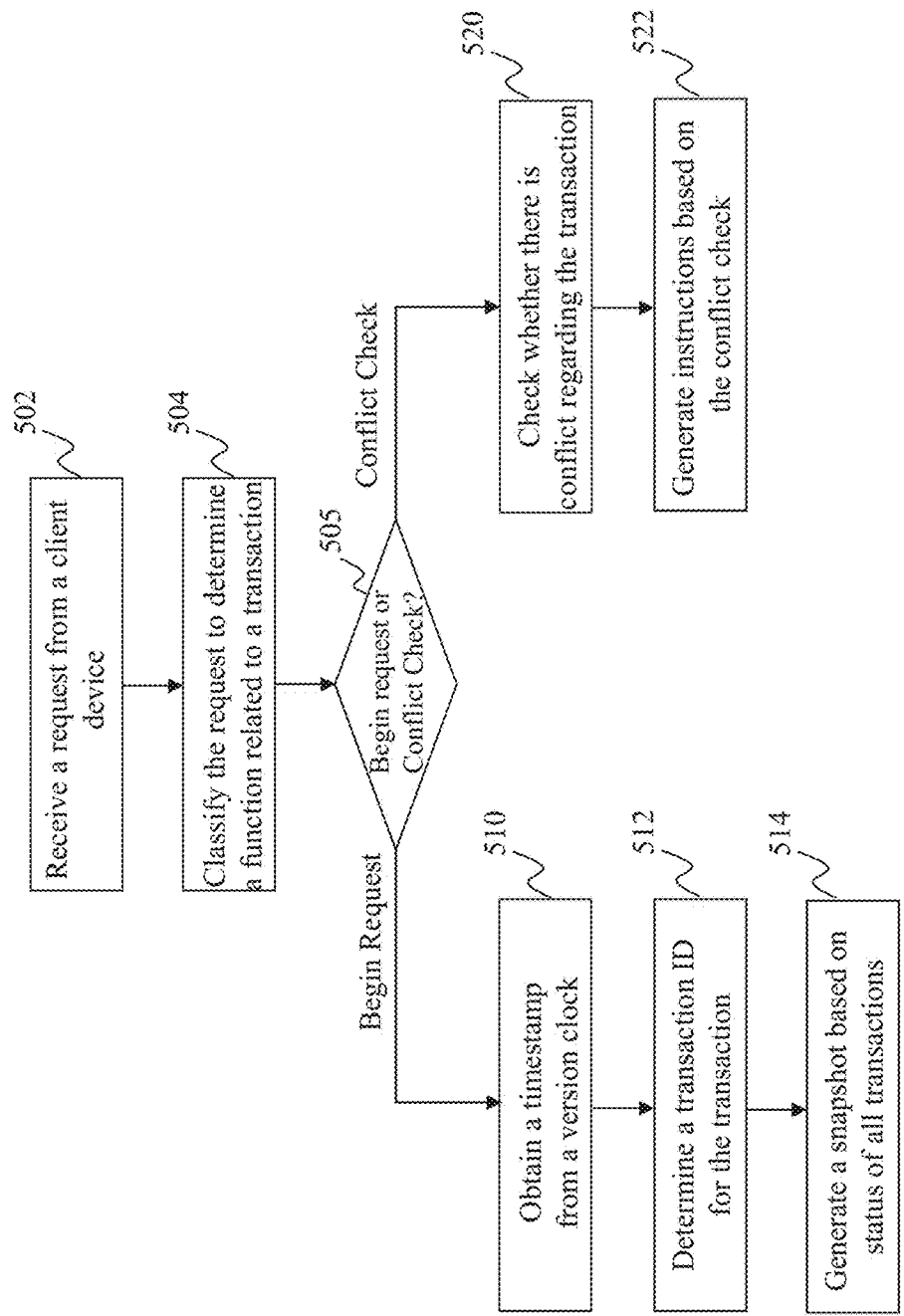
FIG. 5 is a flowchart of an exemplary process performed by a transaction management engine, according to an embodiment of the present teaching.

FIG. 5 is a flowchart of an exemplary process performed by a transaction management engine, e.g. the transaction management engine 104 in FIG. 4, according to an embodiment of the present teaching. At 502, a request is received from a client device. The request is classified at 504 to determine a function related to a transaction. At 505, it is determined whether the request is a begin request, i.e. request to begin a transaction, or a conflict check request. If it is a begin request, the process moves to 510, where a timestamp is obtained from a version clock. Then, a transaction ID is determined at 512 for the transaction based on the timestamp. A snapshot may be generated at 514 based on status of all transactions.

If it is determined at 505 that the request to for conflict check with respect to a transaction, the process goes to 520, where it is checked whether there is conflict regarding the transaction, e.g. between the transaction and one or more other transactions running concurrently with the transaction. At 522, an instruction is generated based on the conflict check, and may be provided to the client device to either persistently commit the transaction or abort the transaction.

Figure 6:
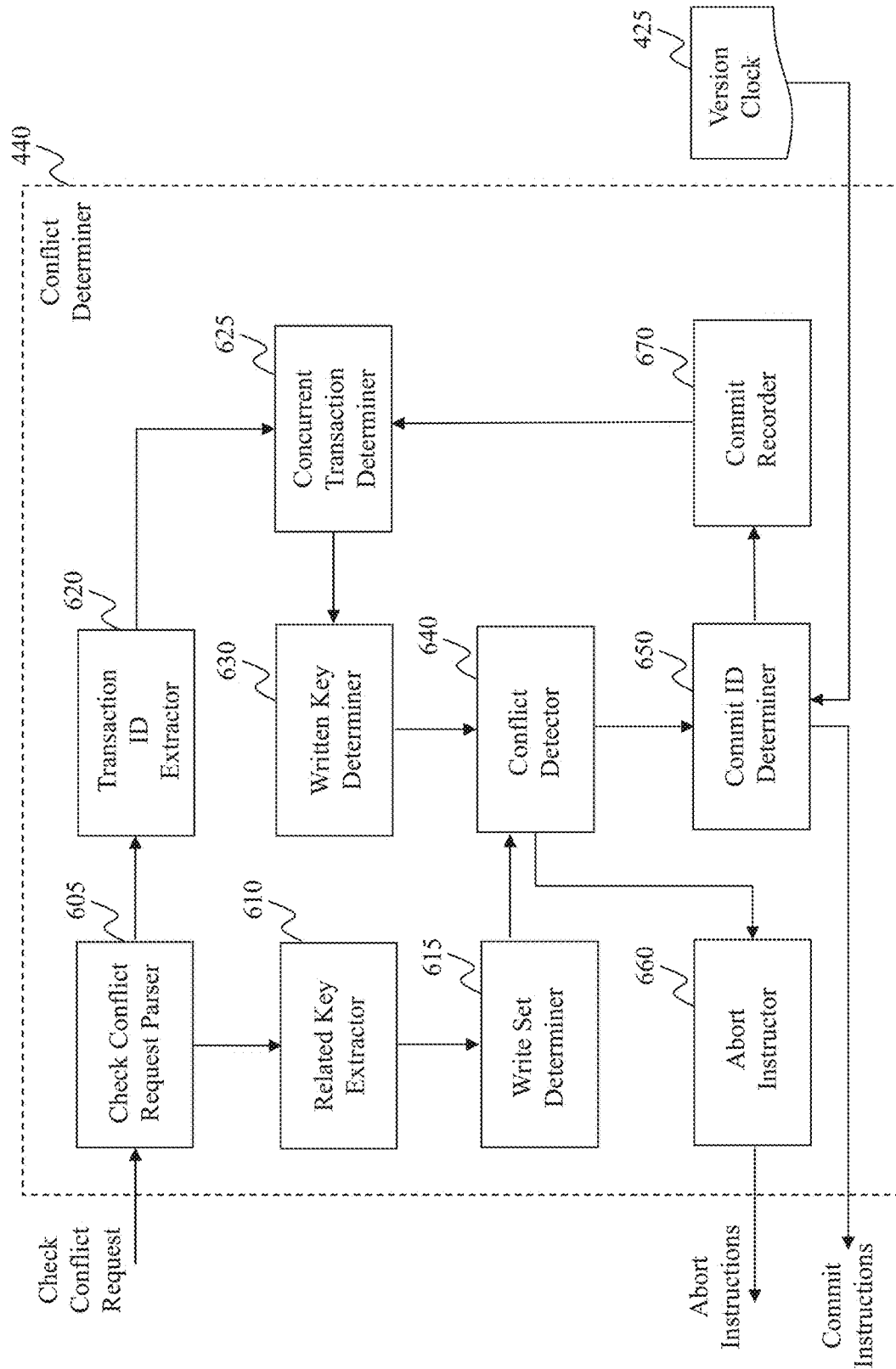
FIG. 6 illustrates an exemplary diagram of a conflict determiner, according to an embodiment of the present teaching.

FIG. 6 illustrates an exemplary diagram of a conflict determiner 440, according to an embodiment of the present teaching. As shown in FIG. 6, the conflict determiner 440 in this example includes a check conflict request parser 605, a related key extractor 610, a write set determiner 615, a transaction ID extractor 620, a concurrent transaction determiner 625, a written key determiner 630, a conflict detector 640, a commit ID determiner 650, an abort instructor 660, and a commit recorder 670.

The check conflict request parser 605 in this example may receive a request for conflict check regarding a transaction, and parse the conflict check request. The check conflict request parser 605 may send the parsed conflict check request to the related key extractor 610 for extracting one or more keys, i.e. a set of keys, for conflict check.

The related key extractor 610 in this example may receive the parsed conflict check request from the check conflict request parser 605, extract the set of keys from the request for conflict check, and send the set of keys to the write set determiner 615 for determining a write set.

The write set determiner 615 in this example may receive the set of keys extracted from the request and determine a write set of the transaction. The write set is a complete set of keys written by the transaction during the execution of the transaction. In one embodiment for checking snapshot isolation, the extracted set of keys is the write set of the transaction. In another embodiment for serializability, the extracted set of keys includes both the write set and a read set of the transaction. The read set is a complete set of keys read by the transaction during the execution of the transaction. The write set determiner 615 may send the determined write set of keys to the conflict detector 640 for conflict detection.

The transaction ID extractor 620 in this example may receive the parsed conflict check request from the check conflict request parser 605, extract a transaction ID associated with the transaction from the request, and send the transaction ID to the concurrent transaction determiner 625 for determining concurrent transactions.

The concurrent transaction determiner 625 in this example may receive the transaction ID associated with the transaction from the transaction ID extractor 620 and determine one or more concurrent transactions based on the transaction ID.

In general, the conflict determiner 440 may check for conflicts between the provided keys of the transaction and keys provided by committed transactions that ran concurrently with the one attempting to commit. For example, consider a transaction with a transaction ID 7 that calls for conflict check with the check conflict request. The conflict determiner 440 may check if any transaction with a larger commit timestamp than 7 has written to a key in transaction 7's list of keys, i.e. transaction 7's write set. In case none has, it allocates a monotonically increasing commit timestamp, for example 10, and records (for example, in an in-memory hash map), that transaction 7's write-set was updated with key 10. If now transaction with a transaction ID 8 will attempt to commit with a common key in its write set, the conflict will be detected, and the conflict determiner 440 will return abort. In one embodiment, the conflict determiner 440 may start from the keys of the transaction and try to detect conflicts with respect to each key of the transaction.

Here in this example, the concurrent transaction determiner 625 may determine all transactions with a commit ID larger than the transaction ID extracted by the transaction ID extractor 620, and send the information about the determined transactions to the written key determiner 630 for written key determination.

The written key determiner 630 in this example may receive the concurrent transactions determined by the concurrent transaction determiner 625 and determine written key(s) for each of the concurrent transactions. The written key determiner 630 may then send a combined set of the written key(s) to the conflict detector 640 for conflict detection.

The conflict detector 640 in this example may receive both the write set of the transaction attempting to commit from the write set determiner 615 and the combined set of written key(s) determined by the written key determiner 630 for the concurrent transactions. The conflict detector 640 may compare the two sets to determine whether there is any overlap.

If there is any overlap between the two sets, it means some transaction with a commit ID larger than the transaction ID has written to a key that is in the write set of the transaction attempting to commit. Hence, a conflict is detected. Then, the conflict detector 640 may inform the abort instructor 660 to generate an abort instruction based on the conflict.

If there is no overlap at all between the two sets, it means there is no transaction with a commit ID larger than the transaction ID has written to a key that is in the write set of the transaction attempting to commit. Hence, no conflict is detected. Then, the conflict detector 640 may inform the commit ID determiner 650 to determine a commit ID and generate a commit instruction accordingly.

The commit ID determiner 650 in this example may receive the confirmation from the conflict detector 640 that no conflict is detected for the transaction attempting to commit. Hence, the commit ID determiner 650 can determine a commit ID based the version clock 425 and generate a commit instruction based on the commit ID. The commit ID is also a globally unique monotonically increasing timestamp generated by the version clock 425, because the version clock 425 is a clock that can generate globally unique monotonically increasing timestamps. The commit ID determiner 650 may send the commit instruction including the commit ID to the client device that executed the transaction, for the client device to finally commit the transaction, i.e. to persist the transaction results to the database 120, with the commit ID. The commit ID determiner 650 may also send the commit instruction to the commit recorder 670 for recording the keys to be committed.

The commit recorder 670 in this example may receive the commit instruction from the commit ID determiner 650 and record the keys to be committed according to the commit instruction. In particular, the commit recorder 670 may parse the commit instruction to determine the keys to be committed by the client device and the commit ID associated with the commit processing. The commit recorder 670 may record that this transaction is committed with the commit ID by the client device and becomes a committed transaction with the commit ID. The commit recorder 670 may send this information to the concurrent transaction determiner 625 so that the concurrent transaction determiner 625 can have updated information about committed transactions, for future concurrent transaction determination.

The abort instructor 660 in this example may receive the confirmation from the conflict detector 640 that a conflict is detected for the transaction attempting to commit. Hence, the abort instructor 660 may generate an abort instruction based on the conflict and send the abort instruction to the client device that executed the transaction, for the client device to abort the transaction, e.g. to erase all data the transaction added to the database 120. In one embodiment, the abort instruction may also include information about the conflict detected.

Figure 7:
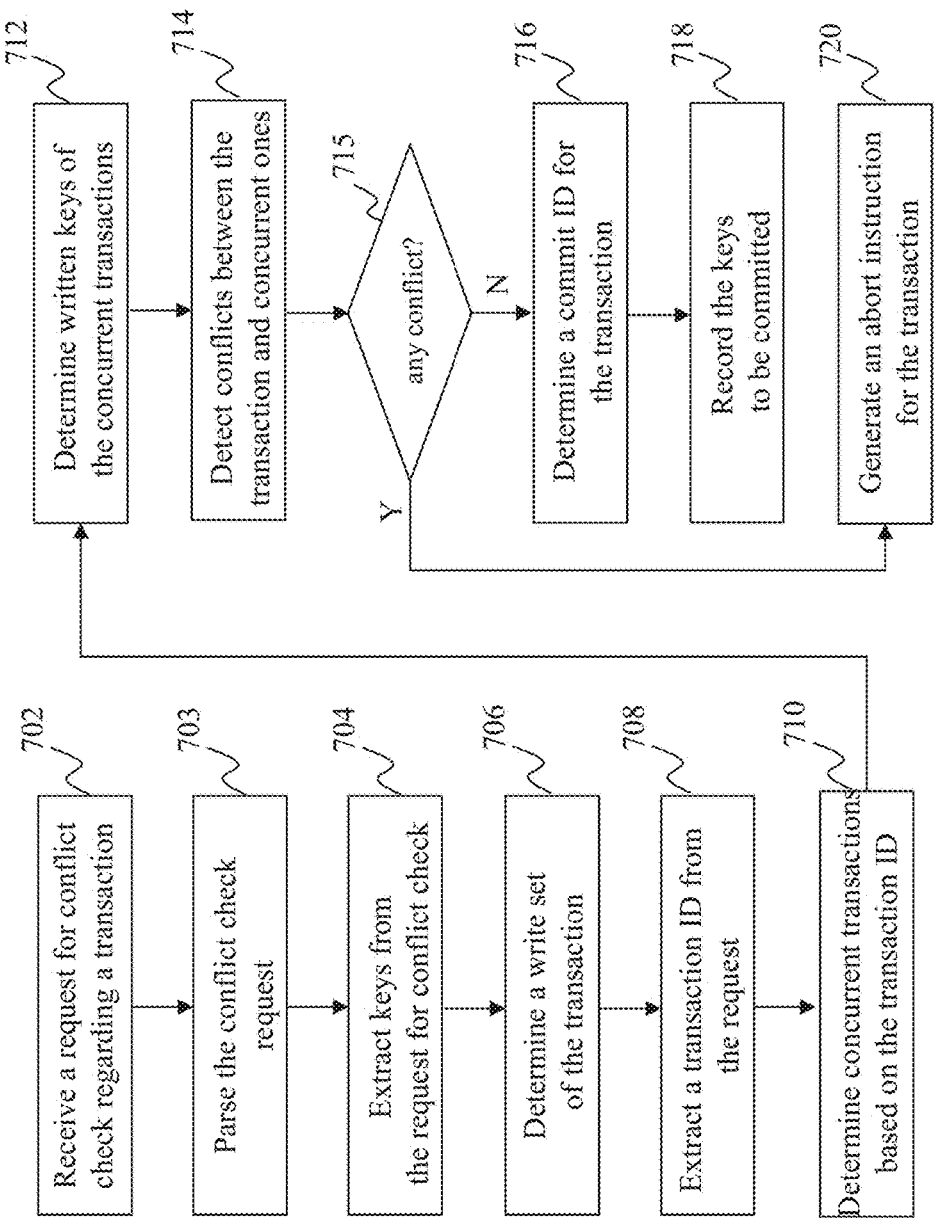
FIG. 7 is a flowchart of an exemplary process performed by a conflict determiner, according to an embodiment of the present teaching.

FIG. 7 is a flowchart of an exemplary process performed by a conflict determiner, e.g. the conflict determiner 440 in FIG. 6, according to an embodiment of the present teaching. At 702, a request for conflict check regarding a transaction is received. The conflict check request is parsed at 703. One or more keys are extracted at 704 from the request for conflict check. A write set of keys for the transaction is determined at 706. A transaction ID is extracted at 708 from the request. At 710, concurrent transactions are determined based on the transaction ID.

Written keys of the concurrent transactions are determined at 712. At 714, the system is trying to detect conflicts between the transaction and the concurrent transactions. If there is any conflict detected at 715, the process goes to 720, where an abort instruction is generated for the transaction to be aborted. If there is no conflict detected at 715, the process moves on to 716, where a commit ID is determined for the transaction to be committed persistently. Then at 718, the keys to be committed for the transaction are recorded with the commit ID.

Figure 8:
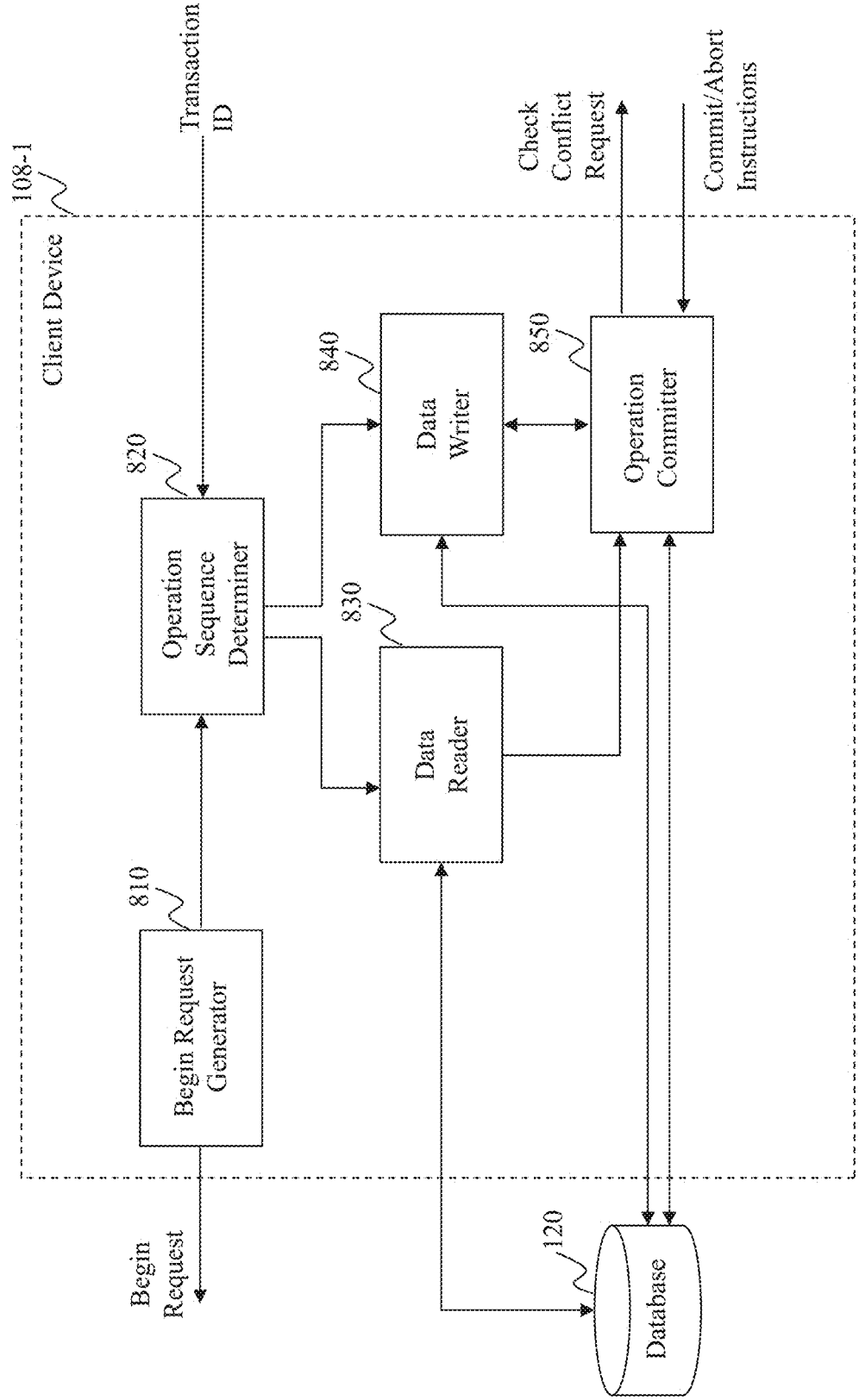
FIG. 8 illustrates an exemplary diagram of a client device, according to an embodiment of the present teaching.

FIG. 8 illustrates an exemplary diagram of a client device 108-1, according to an embodiment of the present teaching. It can be understood that a similar diagram can apply to other client devices 108-2, 108-3, 108-4. As shown in FIG. 8, the client device 108-1 in this example includes a begin request generator 810, an operation sequence determiner 820, a data reader 830, a data writer 840, and an operation committer 850.

The begin request generator 810 in this example may generate a request for beginning a transaction and send the request to the transaction management engine 104 for allocation of a transaction ID. The request may be generated based on an input from a user or an administrator, or based on an event that triggers the transaction. The begin request generator 810 in this example may inform the operation sequence determiner 820 to wait for a transaction ID sent by the transaction management engine 104 for this transaction.

The operation sequence determiner 820 in this example may receive the information about the transaction from the begin request generator 810 and obtain a transaction ID associated with the transaction from the transaction management engine 104. Upon receiving the transaction ID, the operation sequence determiner 820 may determine a sequence of operations for the transaction. For example, the operation sequence determiner 820 may determine a sequence of get and/or put operations to be executed in the transaction. A get operation is to retrieve a value associated with a key specified in the get operation. A put operation is to write a key in the database with a value specified in the put operation. The operation sequence determiner 820 may send each get operation to the data reader 830 for execution and send each put operation to the data writer 840 for execution, according to the sequence determined by the operation sequence determiner 820.

In one embodiment of the present teaching, the client device 108-1 may include a transaction executer that includes the data reader 830 and the data writer 840, and can execute both get and put operations accordingly.

The data reader 830 in this example may perform each get operation determined by the operation sequence determiner 820, e.g. by reading data from the database 120 according to each get operation. In one embodiment, after the data reader 830 performs all get operations for this transaction, the data reader 830 can inform the operation committer 850 for generating a check conflict request. In another embodiment, after the data reader 830 performs some of the get operations for this transaction, the data reader 830 can inform the operation committer 850 for generating a check conflict request. In yet another embodiment, the data reader 830 does not need to inform the operation committer 850 for generating a check conflict request. In one example, the get operations and the put operations in the transaction are involved with each other, where they may share parameters or documents. Then the operation committer 850 can wait for all get/put operations in the transaction to be executed before generating the check conflict check.

The data writer 840 in this example may perform each put operation determined by the operation sequence determiner 820, e.g. by writing data in the database 120 according to each put operation. In one embodiment, after the data writer 840 performs all put operations for this transaction, the data writer 840 can inform the operation committer 850 for generating a check conflict request. In another embodiment, after the data writer 840 performs some of the put operations for this transaction, the data writer 840 can inform the operation committer 850 for generating a check conflict request. In yet another embodiment, the data writer 840 does not need to inform the operation committer 850 for generating a check conflict request when there is no put operation in the transaction. In one example, the get operations and the put operations in the transaction are involved with each other, where they may share parameters or documents. Then the operation committer 850 can wait for all get/put operations in the transaction to be executed before generating the check conflict request.

The operation committer 850 in this example may generate and send a check conflict request to the transaction management engine 104 for conflict check with respect to the transaction, and obtain a commit or abort instruction from the transaction management engine 104. Upon receiving the commit or abort instruction, the operation committer 850 may commit or abort the transaction based on the instruction. In one embodiment, upon receiving the commit or abort instruction, the operation committer 850 may inform the data writer 840 to commit or abort the transaction based on the instruction.

Figure 9:
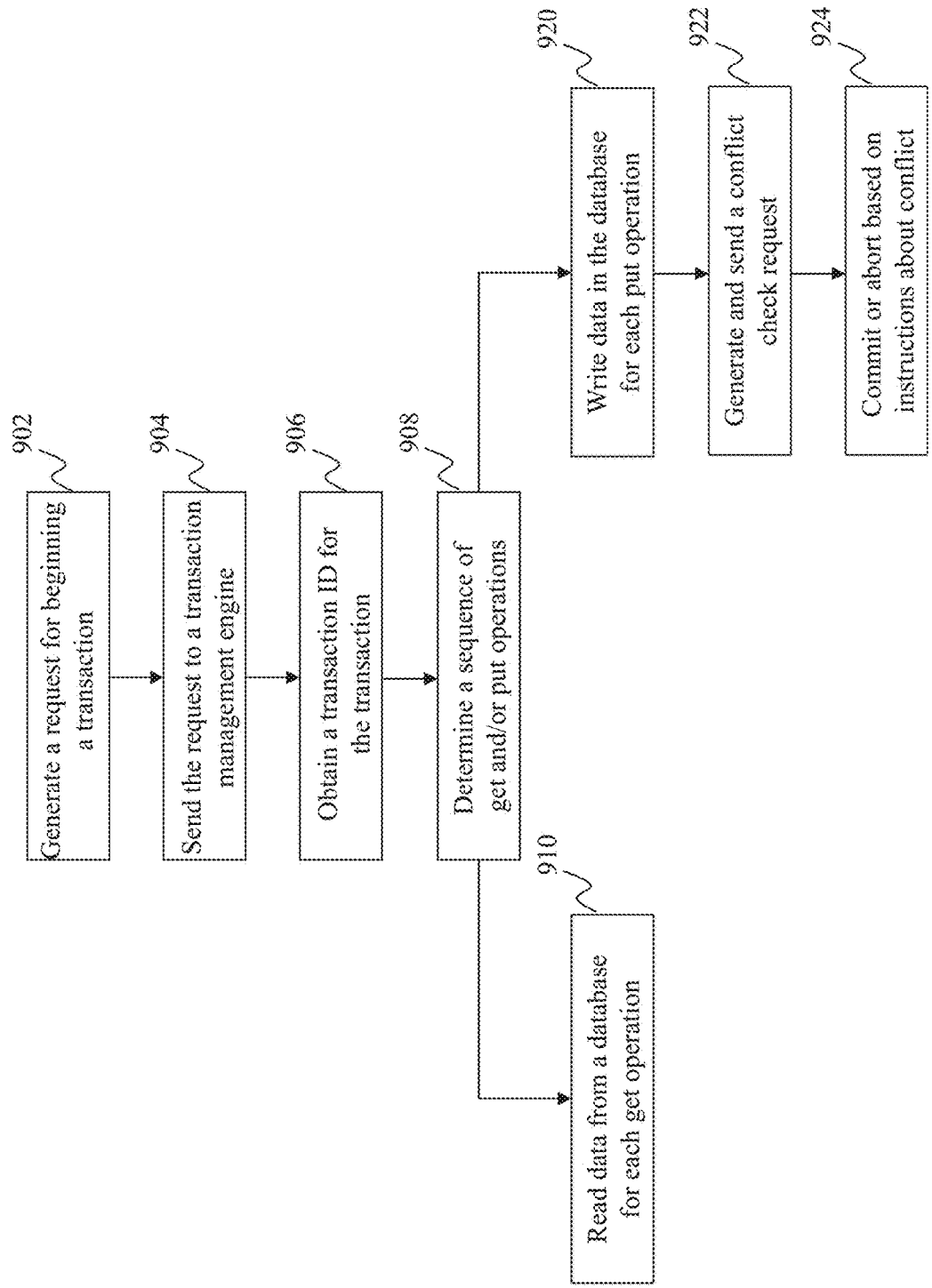
FIG. 9 is a flowchart of an exemplary process performed by a client device, according to an embodiment of the present teaching.

FIG. 9 is a flowchart of an exemplary process performed by a client device, e.g. the client device 108-1 in FIG. 8, according to an embodiment of the present teaching. A request for beginning a transaction is generated at 902. The request is sent at 904 to a transaction management engine, e.g. the transaction management engine 104. A transaction ID associated with the transaction is obtained at 906. A sequence of get and/or put operations is determined at 908 for the execution of the transaction. Each of the get operations is performed at 910 by reading data from a database according to the get operation. Each of the put operations is performed at 920 by writing data in the database according to the put operation.

A conflict check request is generated and sent at 922, e.g. to the transaction management engine 104 for conflict check with respect to the transaction, before persistent commit. At 924, the transaction is committed persistently or aborted, based on an instruction sent by the transaction management engine 104 in response to the conflict check request.

Figure 10:
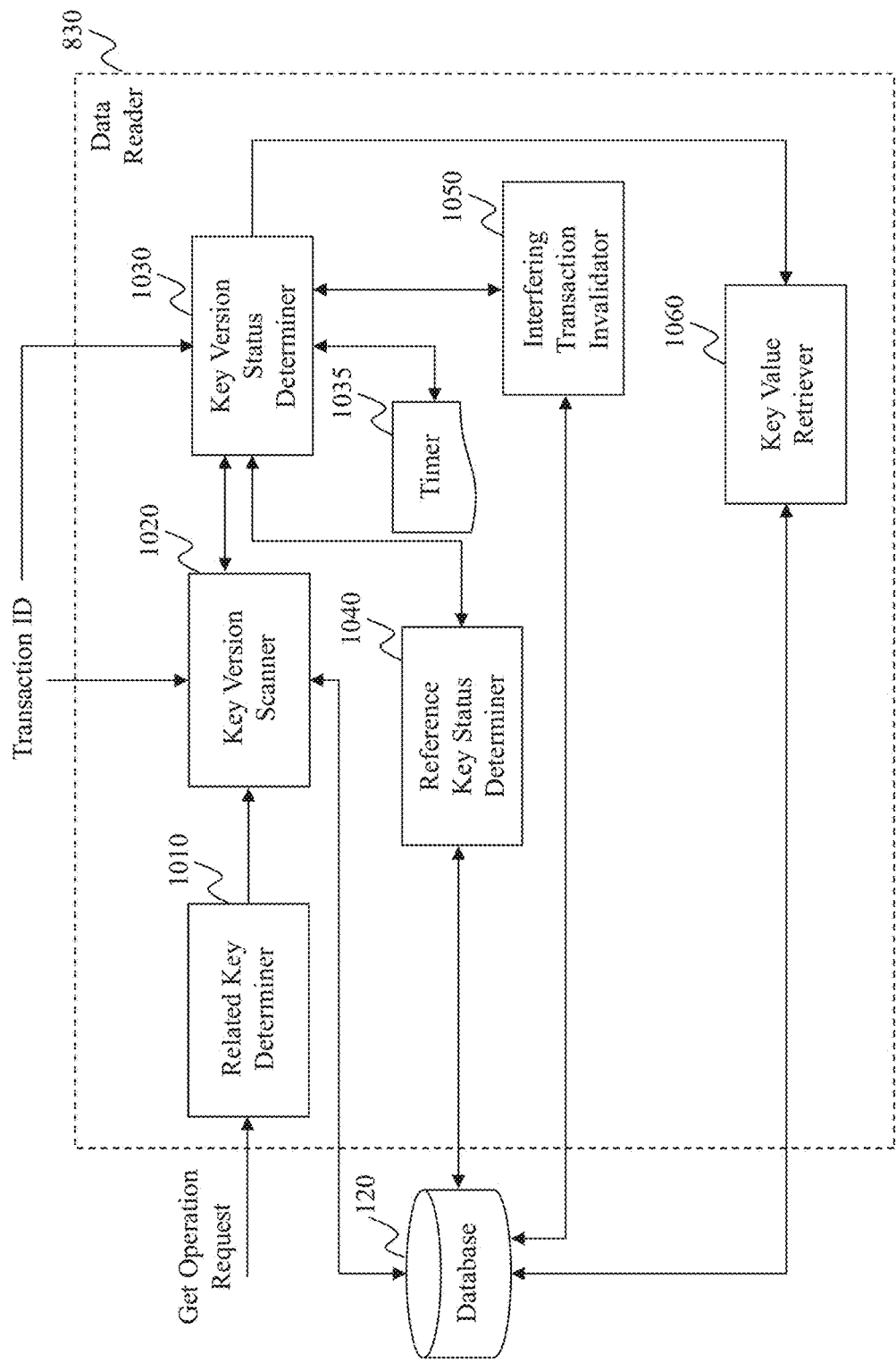
FIG. 10 illustrates an exemplary diagram of a data reader, according to an embodiment of the present teaching.

FIG. 10 illustrates an exemplary diagram of a data reader 830, according to an embodiment of the present teaching. As shown in FIG. 10, the data reader 830 in this example includes a related key determiner 1010, a key version scanner 1020, a key version status determiner 1030, a timer 1035, a reference key status determiner 1040, an interfering transaction invalidator 1050, and a key value retriever 1060.

The related key determiner 1010 in this example may obtain a get operation request from the operation sequence determiner 820. The related key determiner 1010 can determine a key related to the request. For example, the get operation request may specify a key whose value is to be read by the get operation in the transaction. The related key determiner 1010 may then send information about the related key to the key version scanner 1020.

The key version scanner 1020 in this example may obtain a transaction ID associated with the transaction, e.g. from the operation sequence determiner 820. The key version scanner 1020 can scan different versions of the specified key from the database 120. In particular, the key version scanner 1020 may scan starting from a highest version of the versions that are not higher than the transaction ID. After scanning each version, the key version scanner 1020 may send the scanned version to the key version status determiner 1030 for determining a status of the key version.

The key version status determiner 1030 in this example may receive a scanned version from the key version scanner 1020 and determine its status. For example, as shown in FIG. 2, the k1 with version 7 has a status of "committed, 10" which means it has been committed with a commit ID 10. In some case, a status of scanned version is referring to another key. For example, as shown in FIG. 2, the k2 with version 7 has a status of "see k1" which means it has the same status as the k1 with version 7. In this case, the key version status determiner 1030 may instruct the reference key status determiner 1040 to determine a status of a reference key.

The reference key status determiner 1040 in this example may determine a status of a reference key upon an instruction from the key version status determiner 1030. In the above example, the key k1 is a reference key for the key k2. After determining the status of the reference key, the reference key status determiner 1040 may send the status of the reference key to the key version status determiner 1030, such that the key version status determiner 1030 can determine the status of the scanned key version referring to the reference key based on the status of the reference key. In one embodiment, the key version status determiner 1030 may update the status of the scanned key version according to the status of the reference key.

In one situation, the status of a scanned key version may be "tentative", either based on its own status or based on a status of a reference key. The status "tentative" means an interfering transaction is performing a put operation on the scanned key version and/or the reference key. In this case, the key version status determiner 1030 may wait for a designated period for the status to be finalized when the interfering transaction that wrote the key commits or for the record to be removed when the interfering is aborted. The key version status determiner 1030 may wait for a time period according to the timer 1035, before checking again the status. In one embodiment, the interfering transaction may be the transaction itself. In one embodiment, when the scanned key is tentative, the key version status determiner 1030 may instruct the reference key status determiner 1040 to check the status of the first key to determine a commit status.

Since clients are failure-prone, there is no guarantee that the status will ever change. Therefore, a client performing the get operation may eventually attempt to wound or invalidate the interfering transaction by changing the status of its first written key to "invalid", i.e., aborted. This can be done using an atomic read-modify-write operation (put-ifabsent flavor), such that if a race arises where the transaction commits after its status is checked, the invalidation fails. Once this is done, the aborted transaction's remaining written versions may be removed.

In this example, after waiting for the designated period, the key version status determiner 1030 may inform the interfering transaction invalidator 1050 to invalidate the interfering transaction with an atomic read-modify-write operation.

The interfering transaction invalidator 1050 in this example may receive an instruction from the key version status determiner 1030 and invalidate the interfering transaction following the instruction. As discussed above, this may be done by changing the status of its first written key in the database 120 to be "invalid", i.e., aborted. This may be performed with an atomic read-modify-write operation such that if a race arises where the transaction commits after its status is checked, the invalidation fails.

After determining the status of the scanned version at the key version status determiner 1030, when the status is not "tentative", the key version status determiner 1030 may determine whether the status of this scanned version is committed with a smaller commit timestamp than the transaction ID. If so, the key version status determiner 1030 may inform the key value retriever 1060 to retrieve and return the value of this version. If the status is committed with a higher timestamp or if the status is neither committed nor tentative, the key version status determiner 1030 may inform the key version scanner 1020 to continue scanning a preceding version. In case there is no preceding version any more, the key version status determiner 1030 may inform the key value retriever 1060 to return an error message or an instruction that no valid value is available.

In one embodiment, when the interfering transaction invalidator 1050 performs an atomic read-modify-write operation, it reads the status to be different from "tentative". In this case, the interfering transaction invalidator 1050 can inform the key version status determiner 1030 to perform the above described check. As such, the key version status determiner 1030 may determine whether the status of this scanned version is committed with a smaller commit timestamp than the transaction ID. If so, the key version status determiner 1030 may inform the key value retriever 1060 to retrieve and return the value of this version. If the status is committed with a higher timestamp or if the status is neither committed nor tentative, the key version status determiner 1030 may inform the key version scanner 1020 to continue scanning a preceding version. In case there is no preceding version any more, the key version status determiner 1030 may inform the key value retriever 1060 to return an error message or an instruction that no valid value is available.

The key version scanner 1020 and the key version status determiner 1030 will cooperate to scan different versions of the specified key and check the status of the scanned key, until the status of one scanned version is committed with a smaller commit timestamp than the transaction ID. In this case, the key version status determiner 1030 may inform the key value retriever 1060 to retrieve and return the value of this version. The key value retriever 1060 in this example may retrieve and return a value of the committed version to complete the get operation.

Figure 11:
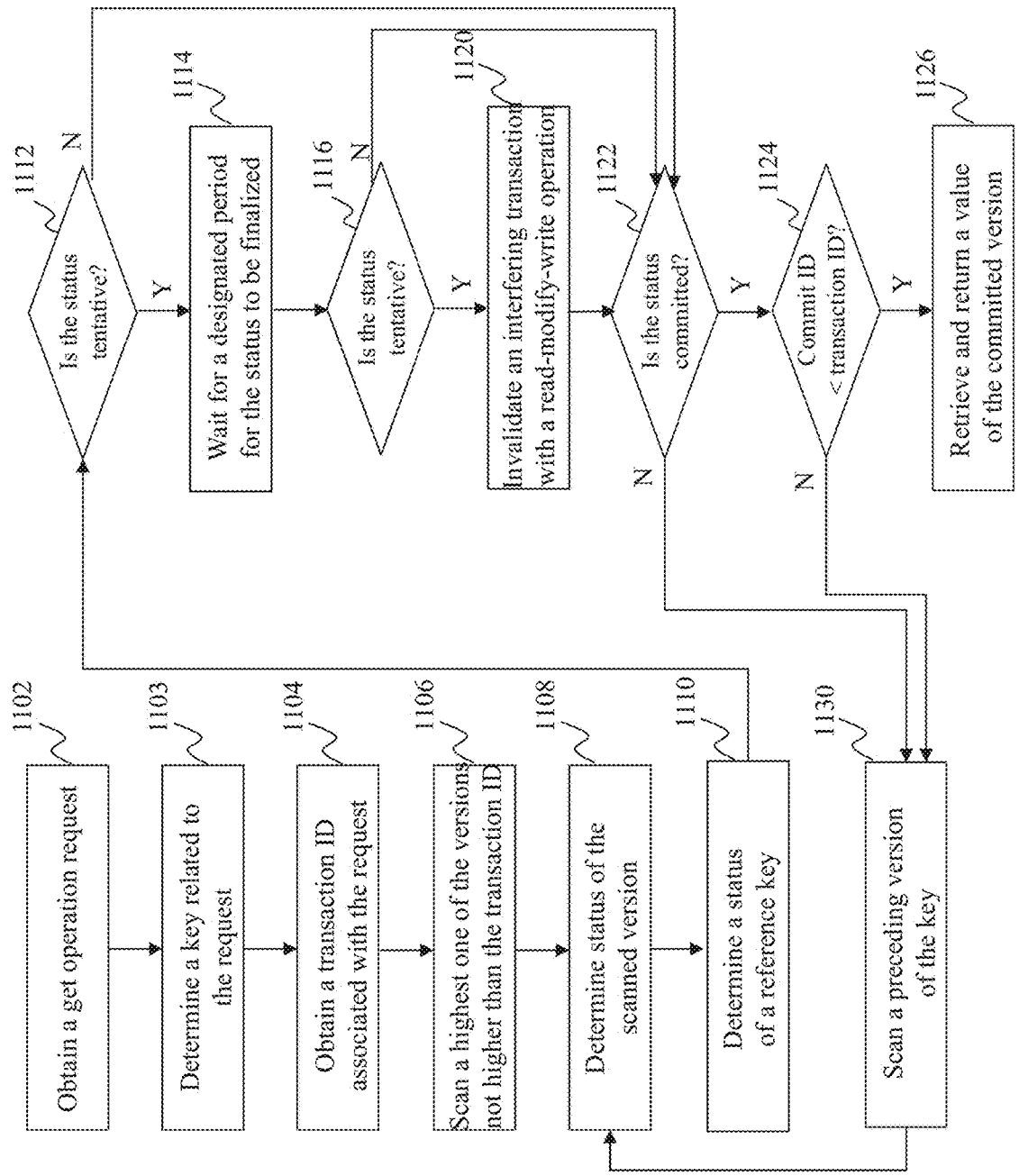
FIG. 11 is a flowchart of an exemplary process performed by a data reader, according to an embodiment of the present teaching.

FIG. 11 is a flowchart of an exemplary process performed by a data reader, e.g. the data reader 830 in FIG. 10, according to an embodiment of the present teaching. A get operation request is obtained at 1102. A key related to the request or specified in the request is determined at 1103. A transaction ID associated with the request is obtained at 1104. At 1106, a highest version of the versions of the key that are not higher than the transaction ID is scanned. A status of the scanned version is determined at 1108. At 1110, a status of a reference key is determined.

Then at 1112, it is determined whether the status is tentative. If so, the process moves to 1114, where the client device waits for a designated period for the status to change. If not, the process moves directly to 1122. After waiting for the designated period, the status may be checked again to determine whether the status is tentative at 1116. If so, the process moves to 1120, where an interfering transaction is invalidated with a read-modify-write operation. If not, the process moves directly to 1122.

At 1122, it is determined whether the status is committed. If so, the process moves to 1124. If not, the process moves to 1130. In one embodiment, if it is determined at 1112 that the status is not tentative, the process moves directly to 1124.

At 1124, it is determined whether the commit ID is smaller than the transaction ID. If so, the process moves to 1126, where a value of the committed version is retrieved and returned for the get operation. If not, the process moves to 1130.

At 1130, a preceding version of the key is scanned. Then, the process goes back to 1108 to determine the status of the scanned version. In one embodiment, if there is no preceding version any more, an error message or an instruction may be generated and returned to inform that no valid value is available for the get operation.

Figure 12:
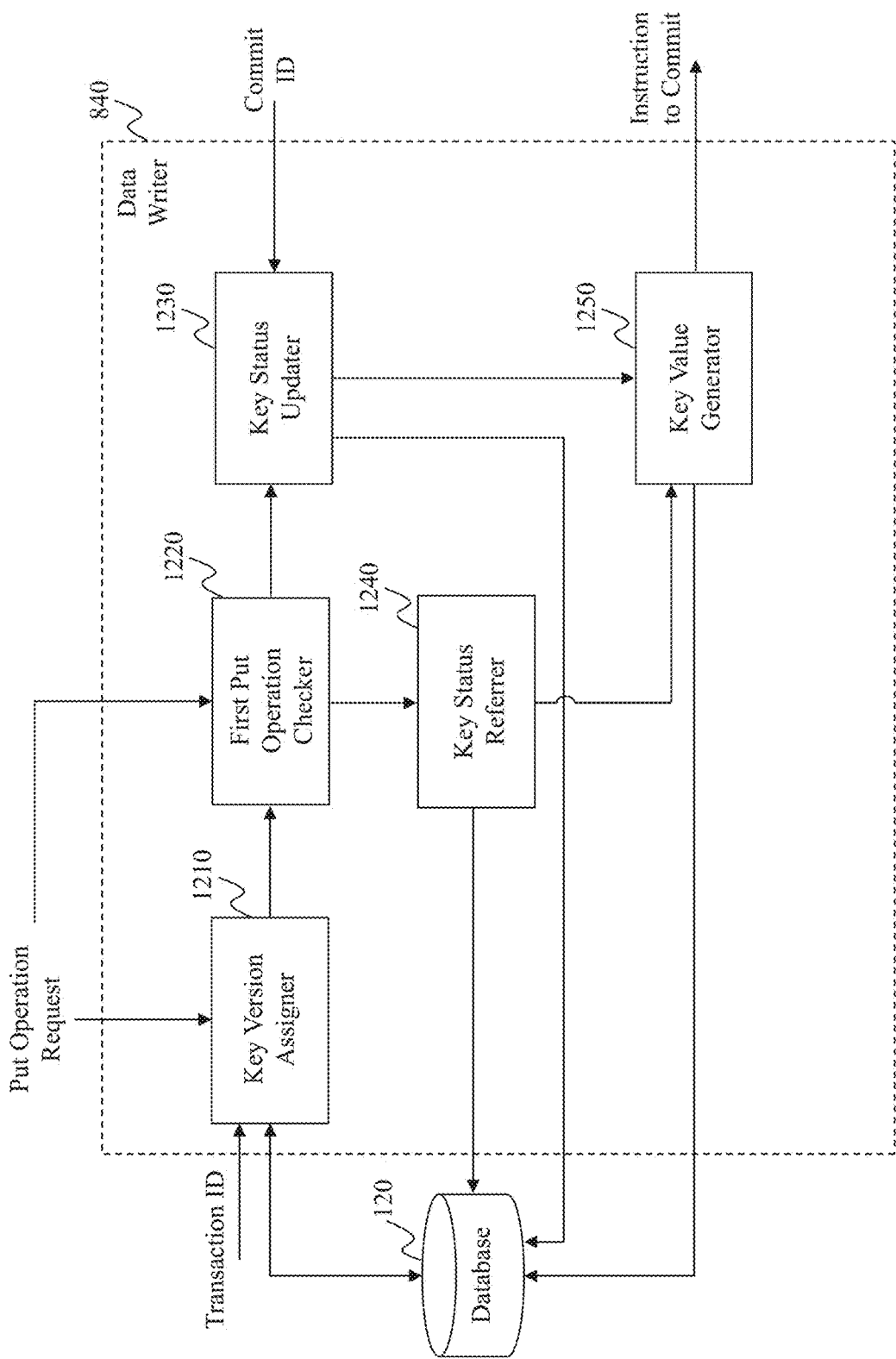
FIG. 12 illustrates an exemplary diagram of a data writer, according to an embodiment of the present teaching.

FIG. 12 illustrates an exemplary diagram of a data writer 840, according to an embodiment of the present teaching. As shown in FIG. 12, the data writer 840 in this example includes a key version assigner 1210, a first put operation checker 1220, a key status updater 1230, a key status referrer 1240, and a key value generator 1250.

The key version assigner 1210 in this example may obtain a put operation request for executing a put operation in a transaction, e.g. from the operation sequence determiner 820. The key version assigner 1210 may also obtain a transaction ID associated with the transaction, e.g. from the operation sequence determiner 820. The key version assigner 1210 can determine the key specified in the put operation, and assign a key version for the key specified in the put operation, e.g. based on the transaction ID. The key version assigner 1210 may send the key version information to the first put operation checker 1220.

The first put operation checker 1220 in this example may obtain the put operation request and the key version information for the put operation in the transaction. In one embodiment, the first put operation checker 1220 may also receive the transaction ID from the key version assigner 1210 or directly from the operation sequence determiner 820. The first put operation checker 1220 may check whether this put operation is the first put operation in the transaction. If so, the first put operation checker 1220 may inform the key status updater 1230 to update the status of the first key to be tentative. If not, the first put operation checker 1220 may inform the key status referrer 1240 to generate and store a status reference to the first key.

The key status updater 1230 in this example may receive the confirmation from the first put operation checker 1220 that this is the first put operation with the first key to be written in the transaction. The key status updater 1230 may then update the status of the first key to be tentative. The key status updater 1230 may inform the key value generator 1250 to generate the key value for the assigned version of the first key.

The key status referrer 1240 in this example may receive the confirmation from the first put operation checker 1220 that this is not the first put operation to be written in the transaction. The key status referrer 1240 may then generate and store a status reference to the first key for the current key. For example, as shown in FIG. 2, the key k2 with version 7 has a status reference "see k1" which means it has the same status as the k1 with version 7. The key status referrer 1240 may inform the key value generator 1250 to generate the key value for the assigned version of the current key.

The key value generator 1250 in this example may generate key values for the put operations. In particular, the key value generator 1250 may receive information from the key status referrer 1240 and/or the key status updater 1230 and generate a key value for the key specified in the put operation and write the key value to the assigned version of the specified key in the database 120. After the execution of the put operation, the key value generator 1250 may generate and send an instruction to commit the transaction, e.g. to the operation committer 850. As discussed above, the operation committer 850 may obtain a commit ID and send it to the data writer 840, e.g. to the key status updater 1230 in the data writer 840, to commit the transaction based on the commit ID.

Upon receiving the commit ID, the key status updater 1230 in this example may persist the results of all put operations of the transaction in the database 120 with the commit ID. For example, the key status updater 1230 may update the first key with the commit ID. Due to potential races with other transactions that may attempt to invalidate the transaction, the commit is also done using an atomic read-modify-write operation (put-if-absent flavor). If this commit operation succeeds, the transaction is considered committed at this point. In one embodiment, the key status updater 1230 may also lazily update the status field in all written keys.

In case the transaction did not perform any put operations, the client can commit without taking any additional actions. In case the response from the transaction management engine 104 is abort, the transaction erases all data it added to the data store. This may be done either by the key status updater 1230 or by the operation committer 850.

Figure 13:
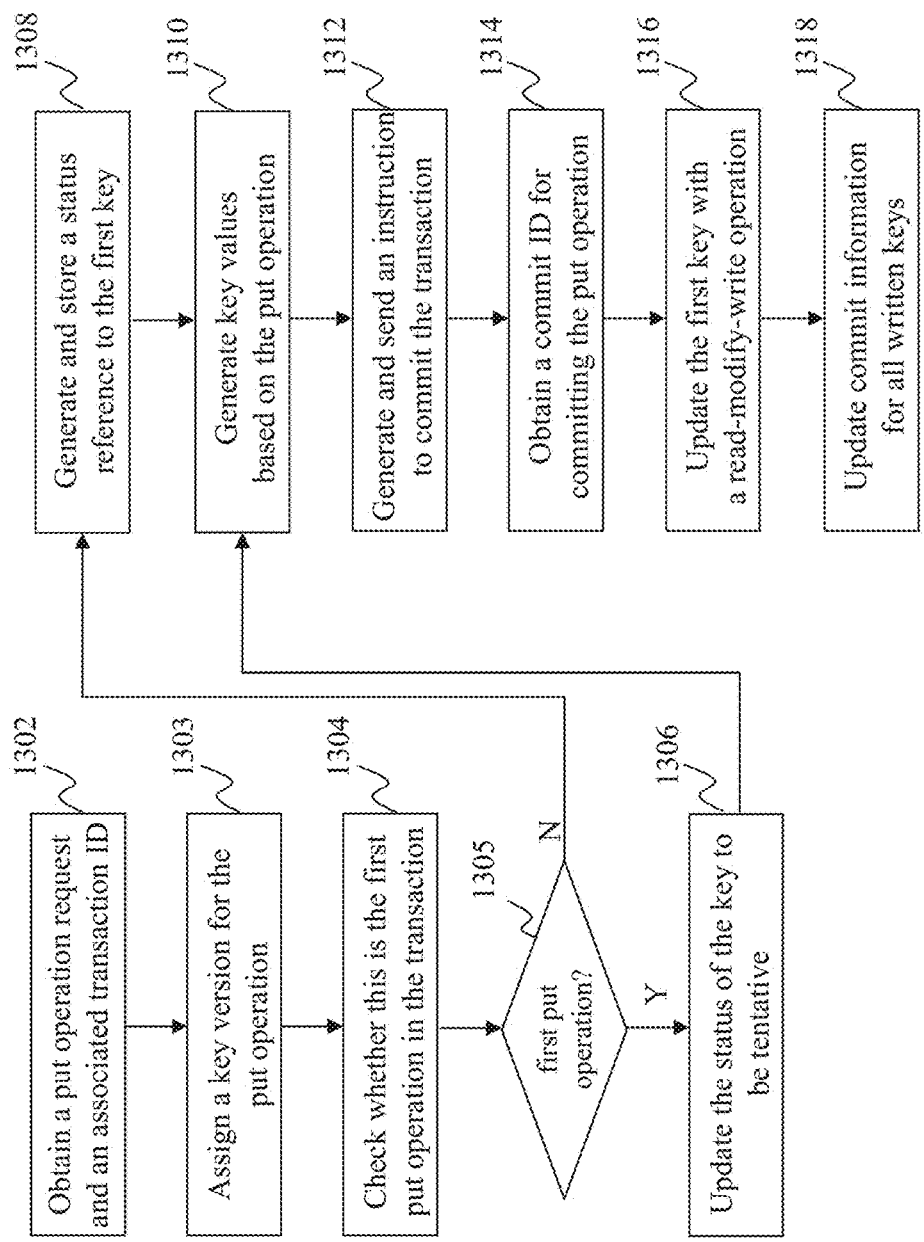
FIG. 13 is a flowchart of an exemplary process performed by a data writer, according to an embodiment of the present teaching.

FIG. 13 is a flowchart of an exemplary process performed by a data writer, e.g. the data writer 840 in FIG. 12, according to an embodiment of the present teaching. At 1302, a put operation request is obtained with an associated transaction ID. A key version is assigned at 1304 for the put operation. It is checked at 1305 whether this is the key put operation in the transaction. If so, the process moves to 1306, where the status of the key is updated to be tentative, and the process then moves to 1310. If not, the process moves to 1308, where a status reference to the first key is generated and stored in association with the current key, and the process then moves to 1310.

At 1310, one or more key values are generated based on the put operation to write the key specified in the put operation. An instruction is generated and sent at 1312 to commit the transaction. A commit ID is obtained at 1314 for committing the put operation persistently. At 1316, the transaction is committed, e.g. by updating the first key of the transaction with a read-modify-write operation. At 1318, the commit information is updated for all written keys. While the commit is performed on the first put using read-modify-write, each of the other written keys points to the first put. As such, the commit information of these keys should be added or updated, for optimization of performance rather than for correctness.

It can be understood that the order of the steps shown in FIG. 5, FIG. 7, FIG. 9, FIG. 11, and/or FIG. 13 may be changed according to different embodiments of the present teaching.

While the present teaching discloses a specific example implementation, many variants of the suggested method are possible. In one example, the first commit indication defining the commit time of the transaction is written in a dedicated column in the first key written by the transaction. In another example, it is possible to write these indications in a dedicated commit table (CT) and forgo the centralization used therein by having the clients write to the table instead of the TM. It is also possible to shard the table in order to allow parallelism at the I/O level. Different conflict detection variants may also be used. In one example, the system may use a single-threaded approach based on a hash map, while in another example the system may use a multi-threaded approach.

Figure 14:
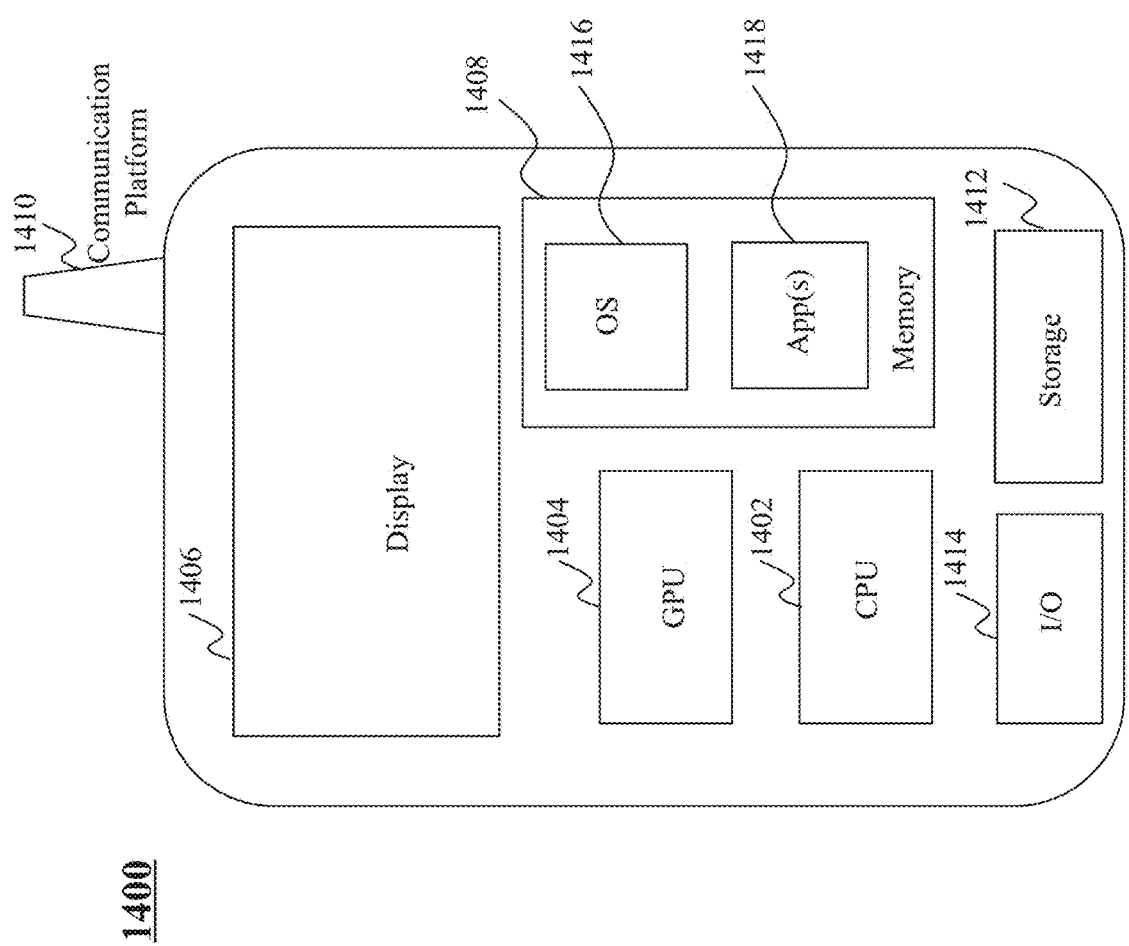
FIG. 14 depicts a general mobile device architecture on which the present teaching can be implemented.

FIG. 14 depicts the architecture of a mobile device which can be used to realize a specialized system implementing the present teaching. In this example, the client devices 108 and/or the transaction management engine 104 may be the mobile device 1400, including, but is not limited to, a smart phone, a tablet, a laptop, a wearable computing device (e.g., eyeglasses, wrist watch, etc.), or in any other form factor. The mobile device 1400 in this example includes one or more central processing units (CPUs) 1402, one or more graphic processing units (GPUs) 1404, a display 1406, a memory 1408, a communication platform 1410, such as a wireless communication module, storage 1412, and one or more input/output (I/O) devices 1414. Any other suitable component, including but not limited to a system bus or a controller (not shown), may also be included in the mobile device 1400. As shown in FIG. 14, a mobile operating system 1416, e.g., iOS, Android, Windows Phone, etc., and one or more applications 1418 may be loaded into the memory 1408 from the storage 1412 in order to be executed by the CPU 1402. User interactions with the device 1400 may be achieved via the I/O devices 1414.

To implement various modules, units, and their functionalities described in the present disclosure, computer hardware platforms may be used as the hardware platform(s) for one or more of the elements described herein (e.g., the client devices 108, the transaction management engine 104 with respect to FIGS. 1-13). The hardware elements, operating systems and programming languages of such computers are conventional in nature, and it is presumed that those skilled in the art are adequately familiar therewith to adapt those technologies for semi-distributed transaction commit processing as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 15:
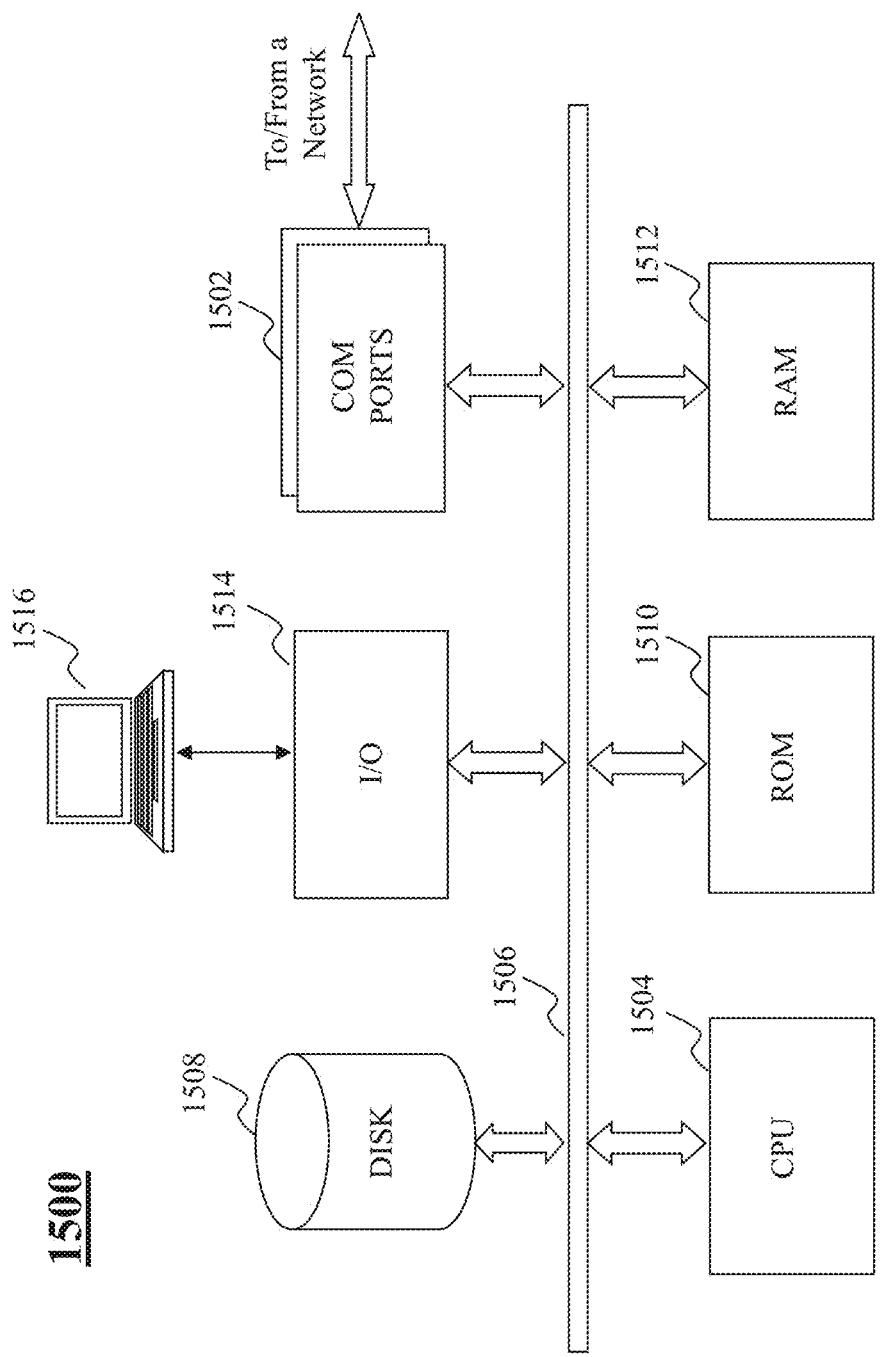
FIG. 15 depicts a general computer architecture on which the present teaching can be implemented.

FIG. 15 depicts the architecture of a computer which can be used to realize a specialized system implementing the present teaching. Such a specialized system incorporating the present teaching has a functional block diagram illustration of a hardware platform which includes user interface elements. The computer 1500 may be a general purpose computer or a special purpose computer. Both can be used to implement a specialized system for the present teaching. This computer 1500 may be used to implement any component of the system 100 as described herein. For example, the client devices 108, the transaction management engine 104, and any of the components of the transaction management engine 104 or the client devices 108 may be implemented on a computer such as the computer 1500, via its hardware, software program, firmware, or a combination thereof. Although only one such computer is shown, for convenience, the computer functions relating to semi-distributed transaction commit processing as described herein may be implemented in a distributed fashion on a number of similar platforms, to distribute the processing load.

The computer 1500, for example, includes COM ports 1502 connected to and from a network connected thereto to facilitate data communications. The computer 1500 also includes a central processing unit (CPU) 1504, in the form of one or more processors, for executing program instructions. The exemplary computer platform includes an internal communication bus 1506, program storage and data storage of different forms, e.g., disk 1508, read only memory (ROM) 1510, or random access memory (RAM) 1512, for various data files to be processed and/or communicated by the computer, as well as possibly program instructions to be executed by the CPU. The computer 1500 also includes an I/O component 1514, supporting input/output flows between the computer and other components therein such as user interface elements 1516. The computer 1500 may also receive programming and data via network communications.

Hence, aspects of the methods of semi-distributed transaction commit processing, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with semi-distributed transaction commit processing. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the semi-distributed transaction commit processing as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for database operation, the method comprising:
　executing a transaction to access a plurality of keys stored in a database, wherein the step of executing includes:
　　reading a first set of keys from the database for each of a sequence of get operations, wherein each of the first set of keys has one or more versions of the key created each time the key is updated, and wherein the step of reading is performed, with respect to each of the first set of keys, by:
　　　scanning the one or more versions of the key, one at a time in a descending order, that are not higher than a transaction ID associated with the transaction, until a status of a first scanned version is committed with a commit ID smaller than the transaction ID, and
　　　returning a value of the first scanned version as the reading of the key;
　transmitting, to a transaction management engine, a request to commit the transaction, wherein the transaction management engine performs a conflict check between the transaction and one or more transactions running concurrently with the transaction, and generates an instruction based on the conflict check;
receiving the instruction from the transaction management engine; and
based on the instruction, causing one or more of the plurality of keys in the database to be updated or causing data added by the transaction to the database to be erased.

2. The method of claim 1, further comprising:
transmitting, to the transaction management engine, a request for beginning the transaction; and
receiving the transaction identity (ID) associated with the transaction from the transaction management engine for executing the transaction.

3. The method of claim 1, wherein executing the transaction further comprises:
writing a second set of keys in the database for each put operation, wherein the transaction further comprises a sequence of put operations; and
generating the request to commit based on the second set of keys, wherein the one or more of the plurality of keys includes the second set of keys, and wherein each key in the database has the one or more versions each of which is determined based on a commit ID allocated to the key when the key was updated.

4. The method of claim 3, wherein writing the second set of keys comprises:
updating a status of a first key in a first put operation of the transaction to be tentative;
for each remaining key of the second set of keys, generating and storing a status reference to the first key; and
generating key values for the second set of keys in the database based on the put operation.

5. The method of claim 1, wherein scanning each of the one or more versions comprises:
determining that the status of the scanned version is not yet committed with the commit ID smaller than the transaction ID, which indicates that a different transaction is currently writing to the scanned version of the key;
waiting for a predetermined period; and
invalidating the different transaction with a read-modify-write operation.

6. A system, having at least one processor, storage, and a communication platform connected to a network for database operation, the system comprising:
a transaction executer configured for executing a transaction to access a plurality of keys stored in a database, wherein the transaction executor comprises:
a data reader configured for reading a first set of keys from the database for each of a sequence of get operations, wherein each of the first set of keys has one or more versions of the key created each time the key is updated, and wherein reading is performed, with respect to each of the first set of keys, by:
scanning the one or more versions of the key, one at a time in a descending order, that are not higher than a transaction ID associated with the transaction, until a status of a first scanned version is committed with a commit ID smaller than the transaction ID, and
returning a value of the first scanned version as the readying of the key; and
an operation committer configured for:
transmitting, to a transaction management engine, a request to commit the transaction, wherein the transaction management engine performs a conflict check between the transaction and one or more transactions running concurrently with the transaction, and generates an instruction based on the conflict check,
receiving the instruction from the transaction management engine, and
based on the instruction, causing one or more of the plurality of keys in the database to be updated or causing data added by the transaction to the database to be erased.

7. The system of claim 6, further comprising:
a begin request generating configured for transmitting, to the transaction management engine, a request for beginning the transaction; and
an operation sequence determiner configured for receiving the transaction ID associated with the transaction from the transaction management engine for executing the transaction and determining a sequence of get and/or put operations.

8. The system of claim 6, wherein the transaction executer comprises:
a data writer configured for:
writing a second set of keys in the database for each put operation, wherein the transaction further comprises a sequence of put operations, and
generating the request to commit based on the second set of keys, wherein the one or more of the plurality of keys includes the second set of keys, and wherein each key in the database has the one or more versions each of which is determined based on a commit ID allocated to the key when the key was updated.

9. The system of claim 8, wherein writing the second set of keys comprises:
updating a status of a first key in a first put operation of the transaction to be tentative;
for each remaining key of the second set of keys, generating and storing a status reference to the first key; and
generating key values for the second set of keys in the database based on the put operation.

10. The system of claim 6, wherein scanning each of the one or more versions comprises:
determining that the status of the scanned version is not yet committed with the commit ID smaller than the transaction ID, which indicates that a different transaction is currently writing to the scanned version of the key;
waiting for a predetermined period; and
invalidating the different transaction with a read-modify-write operation.

11. A machine-readable tangible and non-transitory medium having information for database operation, when read by the machine, causes the machine to perform the following:
executing a transaction to access a plurality of keys stored in a database, wherein the step of executing includes:
reading a first set of keys from the database for each of a sequence of get operations, wherein each of the first set of keys has one or more versions of the key created each time the key is updated, and wherein the step of reading is performed, with respect to each of the first set of keys, by:
scanning the one or more versions of the key, one at a time in a descending order, that are not higher than a transaction ID associated with the transaction, until a status of a first scanned version is committed with a commit ID smaller than the transaction ID, and returning a value of the first scanned version as the reading of the key;

transmitting, to a transaction management engine, a request to commit the transaction, wherein the transaction management engine performs a conflict check between the transaction and one or more transactions running concurrently with the transaction, and generates an instruction based on the conflict check;

receiving the instruction from the transaction management engine; and based on the instruction, causing one or more of the plurality of keys in the database to be updated or data added by the transaction to the database to be erased.

12. The medium of claim 11, further comprising:

transmitting, to the transaction management engine, a request for beginning the transaction; and receiving the transaction identity ID associated with the transaction from the transaction management engine for executing the transaction.

13. The medium of claim 11, wherein executing the transaction further comprises:

writing a second set of keys in the database for each put operation, wherein the transaction further comprises a sequence of put operations; and generating the request to commit based on the second set of keys, wherein the one or more of the plurality of keys includes the second set of keys, and wherein each key in the database has the one or more versions each of which is determined based on a commit ID allocated to the key when the key was updated.

14. The medium of claim 13, wherein writing the second set of keys comprises:

updating a status of a first key in a first put operation of the transaction to be tentative;

for each remaining key of the second set of keys, generating and storing a status reference to the first key; and generating key values for the second set of keys in the database based on the put operation.

15. The medium of claim 11, wherein scanning each of the one or more versions comprises:

determining that the status of the scanned version is not yet committed with the commit ID smaller than the transaction ID, which indicates that a different transaction is currently writing to the scanned version of the key;

waiting for a predetermined period; and invalidating the different transaction with a read-modify-write operation.

* * * * *